March 7, 1967  H. W. JACOBSON  3,307,964
PROCESS OF FORMING PROTECTIVE COATINGS ON COLUMBIUM
AND TANTALUM USING A FLUIDIZED BED
Filed May 7, 1963  2 Sheets-Sheet 1

INVENTOR
HOWARD W. JACOBSON

BY Fred C. Carlson
ATTORNEY

March 7, 1967  H. W. JACOBSON  3,307,964
PROCESS OF FORMING PROTECTIVE COATINGS ON COLUMBIUM
AND TANTALUM USING A FLUIDIZED BED
Filed May 7, 1963  2 Sheets-Sheet 2
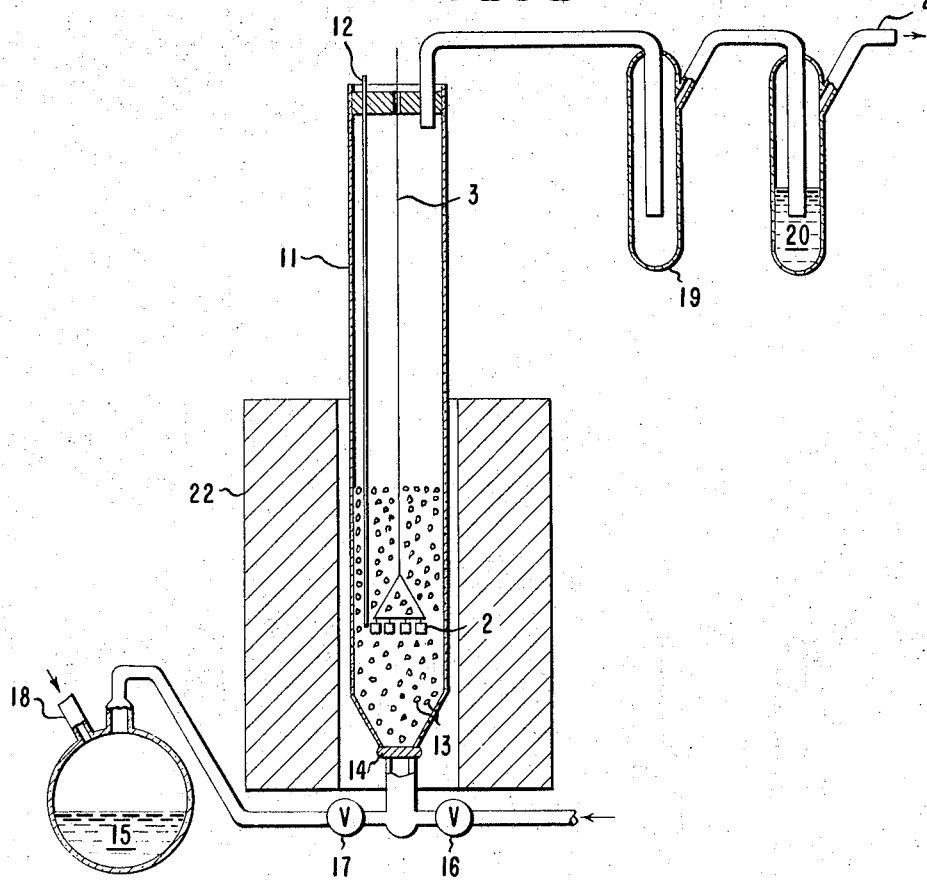
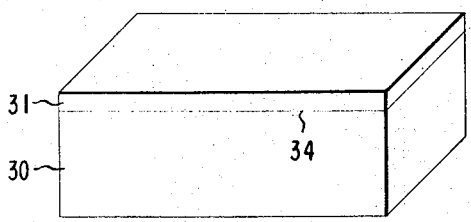
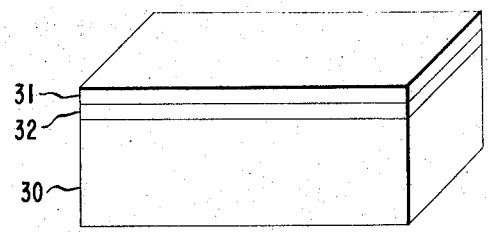
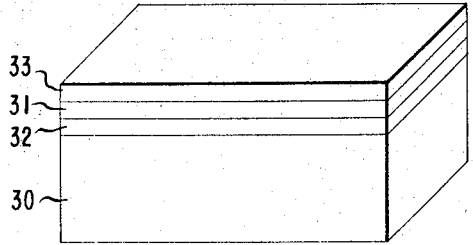
INVENTOR
HOWARD W. JACOBSON
BY  *Fred C. Carlson*
ATTORNEY

United States Patent Office 3,307,964
Patented Mar. 7, 1967

3,307,964
PROCESS OF FORMING PROTECTIVE COATINGS ON COLUMBIUM AND TANTALUM USING A FLUIDIZED BED
Howard W. Jacobson, Wilmington, Del., assignor to E. I. du Pont de Nemours and Company, Wilmington, Del., a corporation of Delaware
Filed May 7, 1963, Ser. No. 278,711
6 Claims. (Cl. 117—71)

This invention relates to coating processes for improving the resistance to oxidation at high temperatures of columbium metal and tantalum metal articles and to the coated, oxidation-resistant articles produced. More particularly the invention is directed to such processes in which an article, comprising a refractory metal selected from the group consisting of columbium and tantalum and having titanium at least at the surface thereof, is heated in a fluidized bed consisting essentially of (a) an oxide selected from the group consisting of silica, alumina, thoria, and zirconia, (b) a metal selected from the group consisting of molybdenum and tungsten, (c) silicon, and (d) iodine vapor, whereby deposition on said article of a layer of disilicide of the metal chosen in (b) is effected, and preferably the metal disilicide-coated article is further heated in a bed comprising (a) an oxide selected from the group consisting of silica, alumina, thoria, and zirconia, (b) silicon, and (c) iodine vapor, whereby a layer of silicon is deposited on the disilicide-coated article; is further directed to such coated articles in which there is a refractory-metal-base alloy selected from the group consisting of columbium-base and tantalum-base alloys, upon the surface of which there is a multilayer coating comprising a first layer of titanium and a second layer of a disilicide of a metal selected from the group consisting of tungsten and molybdenum; and is still further directed to articles in which there is a titanium-bearing, refractory-metal-base alloy, said refractory metal being selected from the group consisting of columbium and tantalum, upon the surface of which there is a coating of a disilicide of a metal selected from the group consisting of tungsten and molybdenum.

Figure 1:
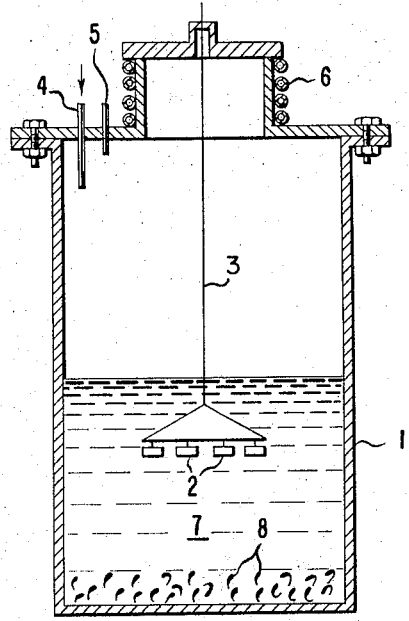
Figure 2:
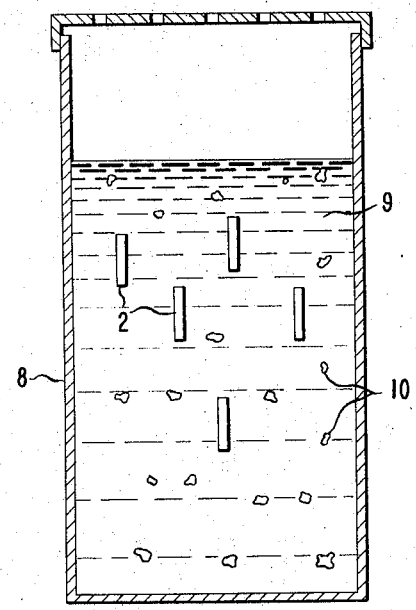

In the drawings:
FIGURE 1 shows in cross section an apparatus for applying a titanium coating to a refractory-metal-base article by a fused salt bath method, and
FIGURE 2 is a cross-sectional view of an apparatus for the same purpose, using a pack-cementation method, and
FIGURE 3 is a cross-sectional view of a fluidized bed reactor for applying a molybdenum disilicide or tungsten disilicide coating according to the invention, and
FIGURES 4, 5 and 6 are simplified representations of coated articles of the invention.

Many columbium and tantalum-based alloys have heretofore been produced which show considerable oxidation resistance at extremely high temperatures, and in addition exhibit some degree of strength and fabricability even at elevated temperatures. The oxidation resistance of such alloys is not sufficient to permit extended exposure to oxidizing and corroding atmospheres at extremely high temperatures; hence greater advantage has been found in preparing refractory alloys which have the desired properties of fabricability and strength, and resorting to a coating process to obtain the desired resistance to corrosion and oxidation.

Coating processes for refractory metals and alloys must give coatings which meet exacting requirements. First, the coating must be extremely oxidation-resistant at very high temperatures. Second, an acceptable coating must be completely compatible with the underlying metal base as regards physical characteristics. For example, there must be compatibility of coefficient of expansion, so that the coating will not spall or crack under high temperatures and thermal shock. Third, if the coating process also produces a coating with the property of self-healing at elevated temperatures, added advantage will be found. Next, to be of economic value, it is important also that the coating process be one by means of which complex shapes may be covered with an even, adherent protective coating. Finally, it is a distinct advantage if the coating process is one which may be carried out within a relatively short time, in simple apparatus.

It is, therefore, an object of this invention to produce oxidation-resistant articles which are extremely stable under conditions of thermal shock. Another object is to produce oxidation-resistant coatings on refractory metals which coatings will exhibit the property of self-healing at extremely high temperatures. A further object is to provide processes by which articles of complex shapes can be coated in relatively simple apparatus and in short periods of time. A specific object is the production of strong, oxidation-resistant articles comprising columbium and tantalum and alloys of these as a base metal.

Now according to the present invention the foregoing and related objects are accomplished and articles having outstanding oxidation resistance at very high temperatures are produced by heating, in a fluidized bed of molybdenum disilicide- or tungsten disilicide-forming reactants a columbium or tantalum or columbium-tantalum metal-containing article which also contains titanium metal, at least on its surface. The materials in the fluidized bed consist of (a) at least one of alumina, silica, thoria or zirconia, (b) tungsten or molybdenum metal or both, (c) silicon, and (d) iodine vapor. The titanium can be alloyed with the columbium and/or tantalum of the base metal of the article, or it can be present as a separate coating upon the surface of the base metal article, or both. Optionally, the molybdenum disilicide or tungsten disilicide coated articles can be further heated in a similar bed, from which the tungsten or molybdenum metal has been omitted; to form a coating of silicon on the disilicide coating, whereby the high temperature resistance of the coated articles is further enhanced and the valuable property of self-healing is conferred. If desired, the columbium or tantalum base metal alloy containing titanium can also contain minor amounts, of the order of 1% by weight, of zirconium, and even smaller amounts, of carbon.

When titanium is supplied as the first layer of a multilayer coating, it forms a diffused layer with the underlying refractory metal base, and serves to bond firmly to the base metal the subsequently applied layer or layers of the coating. Added advantage has been found in using titanium and chromium together as metals to comprise the first-layer coating. Electron microprobe analysis of the coated articles have shown that chromium forms a diffused layer with the tungsten disilicide or molybdenum disilicide second layer of the coatings and contributes additional oxidation resistance to the coated articles.

Over the titanium or titanium-chromium layer the layer of tungsten disilicide or of molybdenum disilicide is applied by a process of the invention. The tungsten disilicide or molybdenum disilicide provides a surface which is extremely hard and oxidation resistant at elevated temperatures. Its expansion characteristics makes this layer completely compatible with the first layer of the coating and with the optionally superimposed silicon layer.

Articles which are to be used at temperatures not in excess of about 2500° F. can be further protected from oxidation at high temperatures by applying a layer of silicon over the tungsten disilicide or molybdenum disilicide coating. Under oxidizing atmospheres the silicon is oxidized, and this SiO₂ coating which is formed is found to be self-healing. However, the volatility of silica at temperatures above about 2500° F. limits the use of a superimposed coating of silicon to those applications below this temperature.

The multilayer coatings can be applied by a combination of processes. If a first layer of titanium or of titanium-chromium alloy is to be used, it can advantageously be applied by employing a fused salt bath in which there is present a lower halide, preferably a lower chloride, of titanium or lower halides of both titanium and chromium. The reduced condition of the halides in the salt bath is maintained by having elemental titanium or elemental titanium and elemental chromium, or an alloy consisting of titanium and chromium, present in the bath. This first layer of titanium or of titanium and chromium alternatively can be applied by the use of a pack-cementation process. Satisfactory results have been obtained by the use of either method.

The layer of tungsten disilicide or molybdenum disilicide is applied by a fluidized bed technique in which iodide transport means are employed. The superimposed coating of silicon, if it is desired, is applied also by fluidized bed techniques.

To explain more fully a process by which a coating of titanium or titanium-chromium can be applied to refractory metals and their alloys, attention is directed to FIGURE 1 which shows an apparatus wherein such layer can be formed on the underlying refractory metal base by a fused-salt bath reaction. This apparatus comprises a stainless steel reactor 1 having a mild steel liner. The specimens to be coated 2 are suspended by a refractory metal wire 3, making it possible to raise or lower the specimens. A gas inlet 4 permits the introduction of an inert gas, and an outlet 5 allows for the exhaust of gases from the reactor. The gas inlet line can be lengthened to submerge the gas flow if agitation of the fused salt bath is desirable, as it has been found to be in some cases. To afford rapid cooling of the specimens after coating, a necked portion at the top of the reactor is provided with cooling coils 6. The fused salt bath is indicated as 7. It comprises an alkali or alkaline earth metal salt which, in addition, must contain a lower halide of titanium or lower halides of both titanium and chromium if the coating is to comprise both metals. Excess metal 8 is present in the bottom of the reactor in the form of elemental titanium metal or of titanium-chromium alloy to maintain reduction of the lower halide or halides.

A preferred salt for the fused bath is sodium chloride. The preferred lower halides are titanium dichloride and chromium dichloride. The preferred quantity of this halide is a total of from about 5 mol percent to about 20 mol percent of fused salt bath. Titanium metal or titanium metal and chromum metal, or an alloy of titanium-chromium is added to the salt bath and the reduced condition of the halide or halides in the fused salt bath is maintained by equilibrating this metal therewith.

The titanium-coating process is started by suspending the samples to be coated on the columbium or tantalum wire in the upper portion of the reactor while the fused salt bath is heated to a temperature of about 1472° F., then lowering them into the fused salt bath and increasing the temperature to about 1652° F. During the entire heating up, coating, and cooling process, a flow of argon is maintained through the reactor. A preferred method of operation is to bubble the argon through the fused salt bath to increase the rate of coating. Without agitation a coating rate of approximately 0.5 mil/hour is attained; whereas, if agitation is supplied the rate of coating can be increased to 1.0 to 1.5 mils/hour.

When a titanium or titanium-chromium coating of the desired thickness has been applied the samples are lifted out of the fused salt bath and are permitted to cool in the inert atmosphere to approximately room temperature. They are then removed from the reactor and are washed with 5% HNO₃ to remove excess salt.

If it is desired to apply the coating of titanium or of titanium-chromium to the refractory metal base by a pack-cementation process, the apparatus shown in FIGURE 2 can be employed.

In FIGURE 2, a refractory metal or refractory metal base alloy container 8 contains an inert granular packing material 9, preferably alumina. Mixed therewith, in about a 50–50 weight ratio, is titanium sponge or granulated titanium-chromium alloy of −4+8 mesh size, 10. Fused alumina of −40+80 mesh size is the preferred inert material. The packed bed of inert material serves the function of minimizing sintering of coating metal or alloy on the surface of the article being coated. Also mixed with the inert material is a small quantity, about 2% by weight based on the packing material, of an alkali metal halide, preferably sodium fluoride. This halide serves as a transport agent for the deposition of titanium or titanium-chromium on the surface of the articles to be coated, 2.

The container thus packed with inert material, granulated metal or alloy, alkali metal halide, and the articles to be coated, is placed within a furnace (not shown) through which a flow of inert gas may pass or which may be evacuated. The container and contents are heated to a temperature in the range of about 1700° F. to about 2300° F. to effect coating of the articles with a layer of titanium or of titanium-chromium alloy.

The tungsten disilicide or molybdenum disilicide layer can be applied using an apparatus shown in diagrammatic cross section as FIGURE 3. In FIGURE 3, a quartz reactor 11 is used, in which are suspended, by refractory metal wire 3, the specimens 2. A thermocouple 12 is used to measure the temperature of the specimens. The fluidized bed of the reactor comprises particles 13 of silica, alumina, thoria, or zirconia (as an inert material), powdered tungsten or molybdenum, and silicon, all shown in suspended condition. The amounts of the powdered metals and of silicon may be varied within rather wide ranges of say, 1–30% by volume of the total bed. A preferred amount is from about 2 to 10%. The bed is fluidized by a flow of inert gas entering the reactor through a porous inlet 14. Carried into the reactor along with a flow of argon admitted through inlet 18 is a small amount of volatilized iodine from an outside vaporizor 15, the iodine acting as a transport agent. Valves 16 and 17 control the flow of argon and iodine into the reactor. The exhaust gas is drawn off from exit 21 through a solids trap 19 and a bubbler trap for gasses 20. Heat to the fluidized bed is supplied by furnace 22.

If it is desired to apply over the disilicide coating a superimposed layer of silicon, the same apparatus as shown in FIGURE 3 can be used, but with a bed composed of inert material (sand or alumina) and silicon powder. Alternatively, the silicon layer can be applied from a static bed, by the pack-cementation process described above.

Refractory metal articles which have been coated by a process of this invention have been subjected to severe testing for oxidation resistance and thermal shock at temperatures of up to 3000° F. The testing apparatus used for thermal shock testing comprises heating means, preferably a flame directed against the test sample, for bringing the temperature of the specimen being tested from room temperature to approximately 3000° F. in a few seconds. The test sample is subjected to this intense heat for a period of 20 seconds, after which the flame is turned off, and a blast of cold air is directed against the sample for 10 seconds. The temperature falls from approximately 3000° F. to near 500° F. almost instantaneously. This alternate heating and cooling within a period of 30 seconds constitutes one "thermal shock cycle."

Many of the coated articles prepared by a process of this invention have withstood more than 1000 thermal shock cycles. When samples fail during thermal shock test, a cloud of oxidized metal can be observed when breakthrough of the coating occurs. An examination of samples in which such failure during test has occured shows that the coating remains intact after the underlying refractory metal or alloy has been completely oxidized and has disappeared.

Coated articles of the invention have also been tested for resistance to repeated heating in air and cooling. Such cyclic tests are carried out by heating the specimens to a designated temperature, say 2500° F., in a muffle furnace in flowing air and holding them at the chosen elevated temperature for one hour. The articles are then removed from the furnace and permitted to cool in air to room temperature, the cooling being accomplished in about five minutes. Maintaining the article at the elevated temperature for a specified period of time and cooling rapidly to room temperature is considered as one "thermal cycle" is oxidation testing.

Refractory metals and alloys which can be coated by a process of this invention comprise columbium, and alloys in which the columbium content is 50% or more by weight of the alloy, and tantalum and alloys in which the tantalum content is 50% or more by weight of the alloy. Preferred alloy compositions to be coated are those alloys which exhibit some degree of strength and fabricability so that they may be rolled or forged into shaped articles before being coated. A preferred alloy to be coated is D-31, a columbium base alloy comprising 10% titanium and 10% molybdenum by weight. If the refractory-metal alloy to be coated is one in which titanium is one of the alloying elements, a coating of tungsten disilicide or molybdenum disilicide alone, or a coating of one of these disilicides with an additional overlay of silicon, will effectively protect the alloy from oxidation at high temperatures. However, even with refractory metal base alloys which comprise titanium, a first-layer coating of titanium applied according to the procedures herein described enhances the oxidation resistance of the articles.

The coated articles of the invention are illustrated, in simplified form, by FIGURES 4, 5, and 6 of the drawings. In FIGURE 4 is shown a refractory metal article 30 of columbium or tantalum or their alloys, having titanium at least at the surface thereof 34, with a coating 31 of molybdenum disilicide or tungsten disilicide or both. In the embodiment illustrated by FIGURE 5 there is the article 30 of columbium, tantalum or alloys of these, having a multilayer coating composed of a first layer 32 of titanium and a second layer 31, of molybdenum disilicide or tungsten disilicide or both. FIGURE 6 illustrates a coated product in which there is again the columbium, tantalum or alloy article 30, upon which there is a multilayer coating composed of a first layer 32 of titanium, a second layer 31 of molybdenum disilicide or tungsten disilicide or both, and a third layer 33 of silicon.

It will be understood that FIGURES 4, 5 and 6 are merely for the purpose of illustrating the relative positions of the layers in the coatings and do not purport to give a precise representation, since there is some diffusion between adjacent layers which cannot adequately be represented by line drawings. Moreover, the drawings do not purport to be to scale.

The invention will be better understood by reference to the following illustrative examples.

EXAMPLE 1

A multilayer coating comprising titanium and tungsten disilicide was put on four samples of columbium-base alloy D-31 (Nb, 10 wt. percent Ti, 10 wt. percent Mo) by the following procedure:

(a) *Application of titanium undercoat layer*

Four coupons of D-31 alloy, each measuring 1" x 2" x 0.040", were suspended by a tantalum wire within a stainless steel reactor of 4" diameter and 13" height, as shown in FIGURE 1. A salt bath was prepared by charging into the reactor about 3 pounds of salt comprising 80 mole percent NaCl and 20 mole percent titanium dichloride. Into the reactor also was charged 25 grams of sponge titanium metal. A flow of argon was directed over the surface of the salt, and heating of the reactor was begun. The temperature, indicated by a thermocouple submerged in the fused salt bath, not shown in FIGURE 1, was raised to 1472° F. At this temperature, the alloy coupons suspended by the tantalum wire were lowered into the fused salt bath. The temperature was raised to 1652° F. and maintained at this level for 1 hour, after which the samples were lifted from the bath and suspended in the upper necked portion of the reactor. The heat was turned off, water turned on in the cooling coils around the necked portion of the reactor, and the samples allowed to cool to room temperature in an atmosphere of argon.

The samples, now coated with titanium to a depth of about 0.5 mil, were removed from thee reactor and washed with 5% $HNO_3$ to remove excess salt.

(b) *Coating with tungsten disilicide*

The titanium-coated alloy coupons were suspended by means of a tantalum wire in the upper part of a reactor as shown in FIGURE 3. The reactor, 4" in diameter and 40" in height, was fitted with a porous (quartz wool) plug which served as the porous inlet 14 of FIGURE 3, and charged to a level of about two inches with powdered tungsten of −20+40 mesh size (U.S. Standard Sieve Scale) and 100 grams of silicon, also −20+40 mesh size. Over these metal and metalloid powders was charged very pure silica of −40+80 mesh size to a level of about 12 inches in the reactor. The reactor was connected to a bulb-type vaporizer in which about 450 grams of iodine was placed and through which vaporizer a flow of argon was directed in order to carry the iodine vapor into the reactor. A supplementary flow of argon was also introduced into the bottom of the reactor through the porous support. The valve indicated by 16 in FIGURE 3 was partially opened and by means of the argon gas flow at a velocity of from 0.2 to 0.3 ft./sec., the silicon, silica, and tungsten charge in the reactor was fluidized. Because of the differences in densities and particle sizes, the silicon and tungsten powders remained, for the most part, at the bottom of the bed. Heating of the reactor was begun, and when the temperature had reached about 1652° F., the specimens were lowered into the upper portion of the fluidized bed. The temperature of the iodine vaporizer was raised to 248–275° F. and valve 17 (FIGURE 3) was partially opened in order to introduce iodine vapor into the reactor. Heating was continued until the temperature in the fluidized bed had reached 1832° F. The operation was continued under these conditions for four hours. At the conclusion of this time, the specimens were raised to the top of the reactor by means of the tantalum wire. Valve 17 was closed to stop the flow of iodine vapor into the reactor, but valve 16 was kept open to maintain the inert atmosphere in the reactor during the cooling of the specimens. Heat was turned off, and the specimens were permitted to cool to room temperature.

By this process, alloy coupons were coated with an 0.5 mil layer of $WSi_2$. Two of the four samples thus coated were reserved for cyclic oxidation testing, and the remaining two coupons were further treated as follows:

(c) *Silicon overlay*

The reactor as shown in FIGURE 3 (used previously to apply the $WSi_2$ coating) was charged with a porous quartz wool plug and with silica as in the previous (b) procedure of this example. Silicon of mesh size −20+40 (U.S. Standard Sieve Scale) was charged into the reactor. The two alloy specimens previously coated with a layer of titanium and tungsten disilicide were suspended in the upper portion of the reactor and heating of the reactor was begun. Flow of argon was started by partial opening of valve 16 (FIGURE 3) and the bed was fluidized thereby. The temperature of the reactor was raised to 1652° F. and valve 17 was partially opened to admit a flow of iodine vapor carried in argon. The suspended samples were lowered into the fluidized silica bed. The temperature was raised to 1832° F. and the operation continued for a period of two hours. At the conclusion of this time the samples were lifted to the upper portion of the reactor, the iodine-argon flow cut off, and the reactor was cooled while the flow of argon through value 16 was continued.

The samples were removed from the reactor and were found to be coated with a 0.3 mil coating of silicon.

The four samples thus coated, two with Ti and WSi$_2$ and two with Ti, WSi$_2$ and Si, were subjected to cyclic oxidation testing according to the heating-cooling procedure described above. The following results were obtained:

TABLE 1.—CYCLIC OXIDATION TESTS OF COATED D-31
[(Nb-10% Ti-10% Mo) (titanium undercoat)]

| Sample Number | Coating Composition | Coating Thickness | No. of 65 minute thermal cycles before failure, 2,500° F. in Flowing Air, to Room Temp. in Flowing Air |
|---|---|---|---|
| 1 | Ti, WSi$_2$ | Ti:0.5-0.7 mil; WSi$_2$, 0.5 mil. | 27 |
| 2 | Ti, WSi$_2$ | Ti:0.5-0.7 mil; WSi$_2$, 0.5 mil. | 31 |
| 3 | Ti, WSi$_2$, Si | Ti, 0.5-0.7 mil; WSi$_2$,0.5 mil; Si:0.3 mil. | 35 |
| 4 | Ti, WSi$_2$, Si | Ti, 0.5-0.7 mil; WSi$_2$,0.5 mil; Si:0.3 mil. | 48 |

A sample of D-31, uncoated, was almost completely oxidized as evidenced by spalling and cracking, and powdering when heated to 2500° F. for one hour and cooled to room temperature.

Failure of the coating in each case was determined by weighing the sample (removed from the crucible in which it was heated) and checking for any discernible weight loss. Any weight loss shows that the coating has failed and the underlying metal is oxidized to a volatile product or a powdery oxide which falls away from the sample. Although the coating may fail at one or more places and oxygen is able to penetrate to the underlying alloy, the coatings themselves appear to remain intact and are unaffected as to appearance even when a change in weight is observed in the sample.

EXAMPLE 2

Using procedure (b) of Example 1, omitting the step of applying a first layer of titanium to the columbium-base alloy specimens to be coated, four coupons of D-31 alloy were coated with a layer of WSi$_2$ by iodide transport reactions. Two of the coated specimens were reserved for testing without further treatment. The remaining two samples were further treated according to procedure (c) of Example 1.

The four specimens thus coated were tested for thermal cyclic oxidation as has been described. The results of these tests are as follows:

TABLE 2.—THERMAL CYCLIC OXIDATION TESTS OF COATED D-31
[(Nb-10% Ti-10% Mo) (WSi$_2$ and WSi$_2$—Si Coatings)]

| Sample Number | Coating Composition | Coating Thickness | No. of 65 minute cycles before failure, 2500° F. in Flowing Air to Room Temp. in Flowing Air |
|---|---|---|---|
| 5 | WSi$_2$ | 0.5 mil | 15 |
| 6 | WSi$_2$ | 0.5 mil | 14 |
| 7 | WSi$_2$, Si | WSi$_2$, 0.5 mil; Si, 0.3 mil. | 11 |
| 8 | WSi$_2$, Si | WSi$_2$, 0.5 mil; Si, 0.3 mil. | 11 |

EXAMPLE 3

According to the procedure described in Example 1, twenty columbium-base alloy specimens comprising five alloy compositions were coated with a multilayer coating comprising Ti, WSi$_2$, and Si. These samples were subjected to thermal cyclic oxidation, three of the four coated samples of each alloy composition being tested to failure, and the fourth sample of each composition being subjected to microhardness testing of its cross-sectional area after a specified number of thermal cycles.

In the microhardness test, hardness profiles were made for the cycled samples for the outside edge toward the center of the coated columbium-base alloy specimen. The test data are recorded in Table 3.

TABLE 3.—HARDNESS PROFILES
[Columbium sheet alloys with protective coating Ti-WSi$_2$-Si; coating thickness (mils) 0.5 Ti 0.36 WSi$_2$ 1.3 Si]

Sample #9 D-14
(Nb+5% Zr)
2,200° F.-Room Temp.
Flowing Air: 20,[1] 28, 26, 27
Microhardness Profile 100 g. KHN (Knoop Hardness Number).

| Uncoated Alloy As Received | | Coated Alloy | | | |
|---|---|---|---|---|---|
| | | Uncycled | | Cycled | |
| d(mm.)[2] | KHN | d(mm.) | KHN | d(mm.) | KHN |
| 0.045 | 219 | 0.04 | 1,291 | 0.045 | 1,291 |
| 0.14 | 222 | 0.09 | 177 | 0.08 | 176 |
| 0.28 | 219 | 0.12 | 163 | 0.14 | 163 |
| 0.58 | 214 | 0.32 | 157 | 0.29 | 165 |
| | | 0.66 | 154 | 0.63 | 158 |

Sample #10 X-34
(Nb+5% W, 3% Zr, 0.1% C)
20,[1] 26, 32, 36

| | | | | | |
|---|---|---|---|---|---|
| 0.05 | 244 | 0.04 | 1,224 | 0.04 | 855 |
| 0.14 | 248 | 0.085 | 214 | 0.09 | 200 |
| 0.33 | 244 | 0.15 | 187 | 0.13 | 172 |
| 0.62 | 244 | 0.28 | 200 | 0.33 | 167 |
| | | 0.59 | 176 | 0.61 | 163 |

Sample #11 D-36
(Nb+10% Ti, 5% Zr)
22,[1] 42, 42, 42

| | | | | | |
|---|---|---|---|---|---|
| 0.06 | 230 | 0.045 | 1,130 | 0.045 | 1,291 |
| 0.15 | 230 | 0.08 | 209 | 0.095 | 202 |
| 0.29 | 230 | 0.11 | 207 | 0.15 | 198 |
| 0.57 | 248 | 0.29 | 202 | 0.31 | 207 |
| | | 0.64 | 191 | 0.62 | 200 |

Sample #12 FS-82
(Nb+33% Ta, 0.75% Zr)
22,[1] 28, 28, 28

| | | | | | |
|---|---|---|---|---|---|
| 0.04 | 250 | 0.04 | 991 | 0.07 | 965 |
| 0.14 | 230 | 0.07 | 176 | 0.11 | 185 |
| 0.31 | 244 | 0.12 | 176 | 0.16 | 163 |
| 0.54 | 233 | 0.27 | 162 | 0.30 | 179 |
| | | | | 0.57 | 193 |

Sample #13 X-110
(Nb+10% W, 1% Zr, 0.1% C)
22,[1] 39, 40, 29

| | | | | | |
|---|---|---|---|---|---|
| 0.04 | 244 | 0.03 | 634 | 0.06 | 1,155 |
| 0.12 | 250 | 0.09 | 207 | 0.08 | 1,130 |
| 0.31 | 230 | 0.13 | 202 | 0.125 | 185 |
| 0.53 | 239 | 0.34 | 196 | 0.30 | 187 |
| | | 0.54 | 185 | 0.61 | 174 |

[1] Specimens tested for microhardness profile after this number of cycles. The additional three samples of each alloy were tested to failure, failure occurring after the indicated number of cycles.
[2] d(mm.)=depth at which hardness was determined.

It will be noted from these results that the hardness of the underlying alloy has decreased when the samples were coated and tested for cyclic oxidation. It is believed that the titanium layer of the coating acts as a getter for the underlying alloy. The distinct drop in hardness between the coating and the underlying alloy shows that there has been no penetration of oxygen into the coated alloy. Micrographs of the cross-sectional areas of these alloys after cyclic oxidation testing show distinct layers of coating and underlying alloy. A diffused titanium zone between columbium-base alloy and $WSi_2$ is visible, as well as an overlying layer of silicon oxide.

EXAMPLE 4

Using specimens of the same alloy compositions as those given in Example 3, ten alloy specimens of five different alloy compositions were coated with a 0.5 mil coating of Ti followed by a 0.36 mil coating of $WSi_2$ according to the procedure given in (a) and (b) of Example 1. The alloy pieces which were coated measured 1″ x 2″ x 0.040″ and were bent around a ½″ diameter mandrel prior to coating. Duplicate coated samples were tested for thermal shock by subjecting the samples to 2200° F. for 20 seconds and shock cooling by a 10 second air blast to cool them to approximately 500° F., and at 3000° F. followed by the 10 second air blast. The heating was carried out by directing an oxygen-acetylene flame against the convex surface of the coated samples and cooling them by means of a blast of cold air. The 30 second period for heating and cooling constitutes one "thermal shock cycle." The results of these tests are given in Table 4.

TABLE 4

[Coating (mil): 0.5 mil Ti, 0.36 mil $WSi_2$]

| | No. of cycles of thermal shock before failure | |
|---|---|---|
| | At 2,200° F. | At 3,000° F. |
| Sample #14 D-14 | More than 1,000 cycles | 150 cycles (av. of 4 samples). |
| Sample #15 X-34 | _____do_____ | Not tested. |
| Sample #16 D-36 | _____do_____ | 600 cycles (av. of 4 samples). |
| Sample #17 FS-82 | Failed after 700 cycles | Not tested. |
| Sample #18 X-110 | More than 1,000 cycles | Do. |

Additional samples of the same composition were tested in a continuous flame at 2800° F. and at 3000° F. in air. Failure in case of these samples is indicated by a "burn-through" in the sample.

TABLE 5.—CONTINUOUS FLAME TESTING OF COATED ALLOY SAMPLES

[Coating: 0.5 mil Ti, 0.36 mil $WSi_2$ (results are average of three tests each)]

| | At 2,800° F. | At 3,000° F. |
|---|---|---|
| D-14 | Failed after 165 min | Failed after 60 min. |
| D-36 | Failed after 250 min | Do. |
| D-31 | Failed after 325 min | Failed after 200 min. |

EXAMPLE 5

Columbium and columbium-base alloys coated by means of a process of this invention show not only outstanding resistance to oxidation but, when silicon comprises the outer layer of the coating, are also self-healing at high temperatures. This has been shown by impact studies on coated alloys as follows:

Duplicate samples of columbium-base alloys of three different compositions were coated with a multilayer coating of Ti-$WSi_2$-Si according to the procedure given in Example 1. Each specimen measured ½″ x 7/16″ x 3/16″. The coated samples were placed in a muffle furnace and heated to 1500° F. The muffle furnace was fitted with a $CO_2$-powered rifle which was capable of propelling pellets at a target at a velocity of approximately 600 ft./sec. Pellets weighing 0.81 gram of hardness $R_c$-28, were fired at the heated, coated specimens, after which they were removed from the muffle furnace and examined. The specimens were found to be severely dented and in some cases many striations appeared in the coating, emanating from the point of pellet impact. The impact specimens were subjected to thermal cyclic oxidation testing at 2200° F. following visual examination.

A second series of coated specimens were impacted and tested in the same manner, except that they were heated to 1800° F. in the muffle furnace and hit when at that temperature.

Results of thermal cyclic oxidation testing of these specimens following impaction at 1500° F. and 1800° F. are given in Table 6.

TABLE 6.—IMPACT TESTING OF COATED SAMPLES

| Sample No. and Alloy Composition | (No. of 1 Hr. Thermal Cycles, to Failure, 2,200° F. in Flowing Air to Room Temperature in Air) | |
|---|---|---|
| | Impacted at 1,500° F. | Impacted at 1,800° F. |
| D-41 (74 Nb-10W-6Mo-10 Ti) | 54 cycles | 13 |
| F-48 (80 Nb-5Mo-15 W) | Cracked on impact and broke in half after 4 cycles. | |
| Nb-3.5 Zr-15 W-0.05 C | Cracked on impact. Survived 9 cycles. | |

EXAMPLE 6

Using the procedure described in Example 1, sixteen specimens of columbium metal (commercial sheet of KHN average 150) were coated, four samples being coated with each of the single layer, or multiple coatings listed in the Table 7. These coated samples were subjected to cyclic oxidation testing, and the results were as given in Table 7.

TABLE 7.—CYCLIC OXIDATION OF COATED COLUMBIUM

[Coating thicknesses: Ti, 0.5 to 0.7 mil; $WSi_2$, 0.5 mil; Si 0.3 mil]

| Coating | $WSi_2$ | Ti-$WSi_2$ | $WSi_2$-Si | Ti-$WSi_2$-Si |
|---|---|---|---|---|
| Number of 1 hr. cycles 2,500° F. to Room Temp. in Flowing Air. | 12, 12, 13, 13 | 21, 16,[1] 27, 23 | 11, 11, 11, 10 | 17, 17, 21, 21. |

[1] Specimen removed for microhardness profile.

A sample of pure columbrium uncoated, oxidized completely when heated in air to 2500° F.

EXAMPLE 7

Using a procedure as described in Example 1 parts (b) and (c), but substituting Mo powder for W powder in the reaction, 18 samples of columbium-base alloy D-31 and 18 samples of columbium-base alloy D-36 were coated with molybdenum disilicide and an overlay of silicon.

In the upper part of a quartz 4″ x 40″ as shown in FIGURE 3, 18 coupons of D-31 each measuring 1″ x 2″ x 0.040″ and 18 coupons of D-36 of the same size were suspended. The reactor was charged with 2800 g. silica sand of particle size —40+80 mesh, 400 grams of molybdenum power —20+40 mesh size, and 400 grams of silicon —20+40 mesh size. The reactor was connected to a bulb vaporizer containing iodine which could be introduced into the reactor by means of flowing argon. An aditional source of argon was used for bed fluidization. By argon flow of 0.2 to 0.3 ft./second the bed was fluidized and heating of the reactor was begun. From the bulb vaporizer indicated as 15 in FIGURE 3, iodine vapor was introduced into the reactor. When the temperature of the bed had reached 900° C., the suspended alloy samples were lowered into the fluidized bed and the heating of the bed was continued until the temeprature was 1000° C. These conditions were maintained for a period of five hours. At the end of this time iodine flow was cut off and heating was discontinued, but the flow of argon was continued and the samples were permitted to cool to room temperature in the fluidized bed.

The samples thus coated with $MoSi_2$ were weighed to determine the amount of coating which had been applied.

The samples were then placed in a second reactor of the same size and charged with the same materials as in the first reactor, with the exception that no molybdenum was used. By carrying out the coating reaction in the same manner as in the first reactor, a coating of silicon 0.001″ to 0.002″ in thickness was placed on the coupons.

Fifteen of the 36 samples thus coated with $MoSi_2$ and an overlay of silicon were tested for resistance to high temperature oxidation by heating in flowing air for one hour at the temperatures indicated in Table 8, followed by rapid cooling to room temperature. In each case, the samples survived the indicated number of thermal cycles before failure. Failure is indicated by any visible chipping or spalling of the sample, and by a change in sample weight. Table 8 shows results of these tests.

TABLE 8.—OXIDATION RESISTANCE OF Nb-BASE ALLOYS WITH $MoSi_2$ COATING

Nb-BASE ALLOY D-36: Nb-10% Ti-5% W

[Si: 0.001″ to 0.002″ depth]

| Sample Code | Weight of $MoSi_2$ Coating (gram per coupons) | No. of Thermal Cycles before Failure | |
|---|---|---|---|
| | | 1 hr. at 2,200° F. rapid cool to room temp. 5 mins. | 1 hr. at 2,500° F. rapid cool to room temp. 5 mins. |
| 1 | 0.0054 | | 2 |
| 2 | 0.0066 | 26 | |
| 3 | 0.0041 | | |
| 4 | 0.0039 | | |
| 5 | 0.0075 | | |
| 6 | 0.0182 | | |
| 7 | 0.0136 | | 2 |
| 8 | 0.0245 | 14 | |
| 9 | 0.0029 | | |
| 10 | 0.0245 | | 3 |
| 11 | 0.0311 | | 3 |
| 12 | 0.0098 | | |
| 13 | 0.0086 | | |
| 14 | 0.0036 | | |
| 15 | 0.0114 | | |
| 16 | 0.0075 | | |
| 17 | 0.0127 | | |
| 18 | 0.0320 | 10 | |

Nb-BASE ALLOY D-31: Nb-10% Mo-10% Ti

| 1 | 0.0011 | | 7 |
| 2 | 0.0053 | 10 | |
| 3 | 0.0057 | | |
| 4 | 0.0103 | | |
| 5 | 0.0141 | | |
| 6 | 0.0193 | | |
| 7 | 0.0259 | | 3 |
| 8 | 0.0155 | | 7 |
| 9 | 0.0303 | | 13 |
| 10 | 0.0288 | 14 | |
| 11 | 0.0205 | 10 | |
| 12 | 0.0215 | | |
| 13 | 0.0163 | 10 | |
| 14 | 0.0333 | | |
| 15 | 0.0381 | | |
| 16 | 0.0308 | | |
| 17 | 0.0307 | | |
| 18 | 0.0257 | | |

EXAMPLE 8

Using the same procedure and the same apparatus as is described in Example 1(a), three coupons of alloy D-14, three coupons of alloy D-31, and three coupons of alloy D-36 were coated with a layer of titanium and then with a layer of $MoSi_2$, as is described in Example 7. The average coating thickness was 0.5 mil Ti and 0.4 mil $MoSi_2$. These nine samples were subjected to cyclic thermal shock tests and results as shown in Table 9 were obtained.

TABLE 9

[Coating (mil): 0.5 mil Ti-0.4 mil $MoSi_2$]

| | No. of cycles of thermal shock before failure—3,000° F. Tests |
|---|---|
| D-14 | 80 (average of three tests). |
| D-36 | 220 (average of three tests). |
| D-31 | 715 (average of three tests). |

EXAMPLE 9

Twelve specimens of D-31 alloy (Nb-10% Ti-10% Mo), each measuring ½″ x ½″ x 0.040″, were coated with Ti-Cr alloy by the pack-cementation process using apparatus as shown in FIGURE 2. The pack was composed of 40% titanium-chromium alloy powder (50% Ti, 50% Cr by weight), and 60% of a mixture of fused alumina (−40+80 mesh size) and NaF (98% $Al_2O_3$, 2% NaF by weight). The pack was placed in an evacuated furnace ($10^{-5}$ mm. vacuum) and held at 2200° F. for 8 hours. The pack was cooled in vacuum and the alloy specimens were found to have a 0.3 mil coating of TiCr.

The specimens were suspended in a fluidized bed reactor and a 0.7 mil coating of $WWSi_2$ was applied following the procedure described in (b) of Example 1.

Following the procedure given in (c) of Example 1, a silicon coating 0.0015″ thick was applied to the TiCr-$WSi_2$ coated specimens.

These twelve specimens, which were coated with TiCr (0.3 mil″)-$WSi_2$ (0.7 mil)-Si (1.5 mil), were subjected to thermal cycling. The specimens averaged 65 thermal cycles (1 hour at 2500° F. to room temperature) before failure.

EXAMPLE 10

Five specimens of tantalum, each 0.030″ x ½″ x ½″, were coated with a Ti-Cr alloy to a depth of 0.4 mil using the same pack-cementation procedure as is described in Example 9. The five Ti-Cr-coated specimens were then coated with $WSi_2$ to a depth of 1 mil by the fluidized bed technique described in (b) of Example 1, followed by coating with 1.2 mil Si using the process of (c) in Example 1.

The five specimens were tested for resistance to oxidation by thermal cycling, and were found to average 40 thermal cycles (1 hour at 2500° F. to room temperature) before failure.

EXAMPLE 11

Sixteen alloy samples 0.036″ x ½″ x ½″ (Ta-10% W) were coated with a Ti-Cr alloy to a depth of 0.7 mil. This coating was applied using the same pack composition as is given in Example 9, but a temperature of 2300° F. for a period of 16 hours, and $10^{-5}$ mm. vacuum. These 16 samples were then coated with a 0.6 mil layer of $WSi_2$ using the fluidized bed procedure as given in (b) of Example 1, followed by a 1.1 mil coating of silicon.

These sixteen coated alloy samples were tested for resistance to oxidation by thermal cycling. The 16 specimens averaged 68 thermal cycles (1 hour at 2500° F. to room temperature) before failure.

In the examples given above in which $WSi_2$ or $MoSi_2$ and Si coatings are applied to refractory-metal-base alloys using a fluidized bed technique, the inert bed material in each case has comprised silica particles. Instead of silica as the inert bed material, alumina of appropriate mesh size, preferably −40 to +80 mesh (U.S. Standard Sieve Scale) can be used to equally good advantage. In cases where silica is used, this material will itself become coated with metal by the cracking of the iodide compounds formed in another portion of the reaction. Alumina does not accept the metal values and does not become coated with metal. The reason for this difference between silica and alumina is not readily apparent. One important purpose served by the inert material in the fluidized bed is to provide a very uniform heating of the specimens and coating materials. Also, the inert bed distributes the iodide values uniformly. A further purpose is to avoid stickiness in the bed, since it has been found that if no inert material is present, metal beds tend to be sticky and deposit nonuniform metal layers on the pieces to be coated. Furthermore, it has been found that the inert particles function to scrub the specimen surfaces free from the somewhat sticky metal particles, and make possible a smooth, even coating on the metal pieces.

In the examples specific temperatures of heating of the bed in the disilicide and silicon coating operations have been shown, but it will be understood that a range of temperatures can be used. Broadly, the temperature range for the disilicide deposition is from 1652 to 2192° F., with 1742 to 1922° F. being preferred. For forming the silicon overlay, if desired, the broad temperature range is from 1562 to 2282° F., a temperature of from 1652 to 1832° F. being usually preferred.

I claim:

1. In a process for the production of a coated refractory-metal-base article resistant to oxidation at high temperatures, the step comprising heating an article, comprising a refractory metal selected from the group consisting of columbium and tantalum and having titanium at least at the surface thereof, in a fluidized bed consisting essentially of (a) particles of an oxide selected from the group consisting of silica, alumina, thoria, and zirconia, (b) a powdered metal selected from the group consisting of molybdenum and tungsten, (c) silicon, and (d) iodine vapor, whereby deposition on said titanium-comprising refractory-metal article of a layer of disilicide of the metal chosen in (b) is effected.

2. A process for the production of a coated refractory-metal-base article resistant to oxidation at high temperatures, comprising heating a columbium-titanium-comprising article having titanium at least at the surface thereof, in a fluidized bed according to claim 1.

3. A process for the production of a coated metal-base article resistant to oxidation at high temperatures comprising heating in a fluidized bed according to claim 1 an article comprising a refractory alloy in which a metal selected from the group consisting of columbium and tantalum comprises at least 50% by weight of the alloy, upon which refractory alloy article there has previously been deposited a titanium coating.

4. A process for the production of a coated refractory-metal-base article resistant to oxidation at high temperatures, comprising heating a tantalum-titanium-comprising article having titanium at least at the surface thereof, in a fluidized bed according to claim 1.

5. In a process for the production of a coated refractory-metal-base article resistant to oxidation at high temperatures, the steps comprising (1) heating an article, comprising a refractory metal selected from the group consisting of columbium and tantalum and having titanium at least at the surface thereof, in a fluidized bed consisting essentially of (a) particles of an oxide selected from the group consisting of silica, alumina, thoria and zirconia, (b) a powdered metal selected from the group consisting of molybdenum and tungsten, (c) silicon, and (d) iodine vapor, whereby deposition on said titanium-comprising refractory-metal article of a layer of disilicide of the metal chosen in (b) is effected, and (2) heating said metal-disilicide-coated article in a fluidized bed comprising (a) an oxide selected from the group consisting of silica, alumina, thoria and zircona, (b) silicon, and (c) iodine vapor, whereby a layer of silicon is deposited on said disilicide-coated article.

6. A process for the production of a coated metal-base article resistant to oxidation at high temperatures comprising heating in a fluidized bed according to claim 5 a refractory alloy article comprising a refractory alloy in which a metal selected from the group consisting of columbium and tantalum comprises at least 50% by weight of the alloy, upon which refractory alloy article there has been previously deposited a titanium coating.

References Cited by the Examiner

UNITED STATES PATENTS

| 2,763,920 | 9/1956 | Turner et al. | 29—198 |
| 2,771,666 | 11/1956 | Campbell et al. | 29—198 |
| 2,783,164 | 2/1957 | Hill | 117—71 |
| 2,796,361 | 6/1957 | Chester et al. | 117—71 |
| 3,037,883 | 6/1962 | Wachtell et al. | 117—107.2 |
| 3,090,702 | 5/1963 | Commanday et al | 117—106 |
| 3,117,846 | 1/1964 | Chao | 117—107.2 X |
| 3,178,308 | 4/1965 | Oxley et al. | 117—106 |
| 3,216,806 | 11/1965 | Sama et al. | 29—198 X |
| 3,219,474 | 11/1965 | Priceman et al. | 117—71 |
| 3,249,462 | 5/1966 | Jung et al. | 117—71 X |

ALFRED L. LEAVITT, *Primary Examiner.*

RICHARD D. NEVIUS, *Examiner.*

J. R. BATTEN, JR., *Assistant Examiner.*